United States Patent

[11] 3,529,520

| [72] | Inventor | Robert Leon Thiebault<br>Paris, France |
|---|---|---|
| [21] | Appl. No. | 693,239 |
| [22] | Filed | Dec. 26, 1967 |
| [45] | Patented | Sept. 22, 1970 |
| [73] | Assignee | La Ville de Paris<br>Paris, France |
| [32] | Priority | Dec. 30, 1966 |
| [33] | | France |
| [31] | | No. 89442 |

[54] APPARATUS FOR PHOTOGRAPHING FINGERPRINTS
8 Claims, 4 Drawing Figs.

[52] U.S. Cl. .................................................. 95/1.1,
355/47, 355/66
[51] Int. Cl. ...................................................... G03b 27/70
[50] Field of Search ........................................... 95/1.1;
355/47, 49, 77, 65, 8, 17

[56] References Cited
UNITED STATES PATENTS

| 1,896,246 | 2/1933 | Owens | 355/49 |
|---|---|---|---|
| 2,058,415 | 10/1936 | Chretien | 355/49 |
| 2,357,827 | 9/1944 | Hopkins | 355/47 |
| 2,794,379 | 6/1957 | McNeil | 95/15 |
| 2,953,061 | 9/1960 | Pfaff | 355/65 |
| 3,301,126 | 1/1967 | Osborne et al. | 355/8 |

*Primary Examiner*—Norton Ansher
*Assistant Examiner*—D. J. Clement
*Attorneys*—Robert E. Burns and Emmanuel J. Lobato ABSTRACT: In an apparatus for photographing fingerprints, the finger to be photographed is placed against a part-cylindrical surface in the interior of a transparent finger support having a part-cylindrical outer surface. An optical system mounted for rotation about the axis of the finger support successively explores the generatrices of the finger support and focuses a line image of each said generatrix onto a photographic film wrapped around a corresponding part-cylindrical photographic film support.

Patented Sept. 22, 1970
3,529,520
Sheet 1 of 2
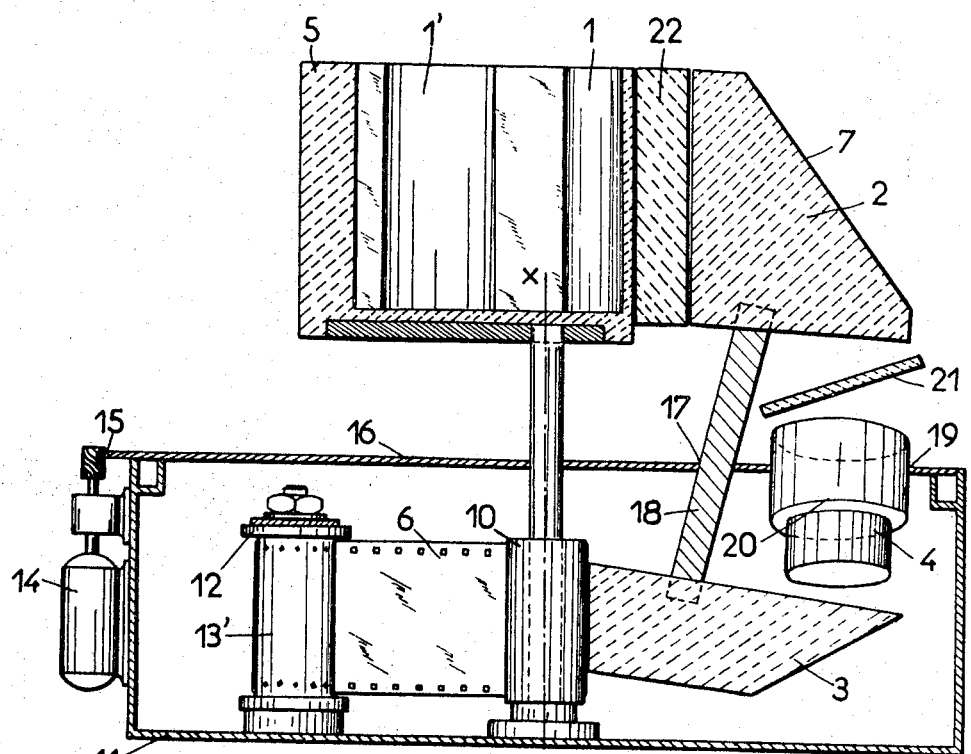
FIG.4
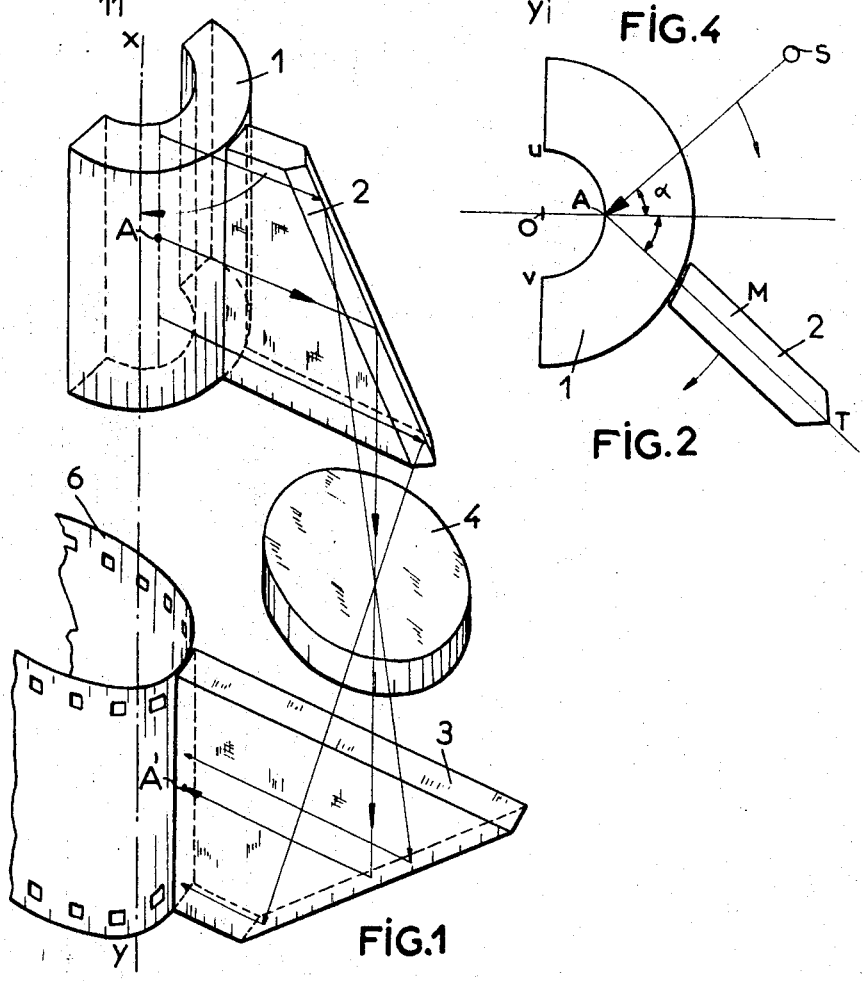
FIG.2
FIG.1

APPARATUS FOR PHOTOGRAPHING FINGERPRINTS

As is known, the method currently used for taking fingerprints calls for inking by means of an ink pad and then printing on paper by direct application with a rocking movement. This method only requires simple materials but is not without frequent imperfections in the resulting documents. Some characteristic details, such as entire portions of the print, may be altered beyond correction as a result for example of excessive inking of the finger, blotting or slipping on the paper at the moment of blotting.

The present invention has for its object an apparatus permitting the photography of papillary ridges without deformation, distortion or blotting, in the particular form required which is the development on a plane of the surface of the end of a finger.

The apparatus according to the invention is characterised by the fact it comprises a hollow transparent semi-cylindrical support against the internal face of which is applied the surface of the finger to be photographed and a movable assembly turning about the axis of the said support and comprising an optical member which successively explores all the generatrices of this transparent support, a photographic objective receiving the light rays from this moving exploring member and transmitting them to an optical receiving member which is also mounted on the mobile assembly and which reprojects the image formed by the objective on to a photographic film supported on a cylindrical surface similar to and preferably co-axial with the internal face of the finger support.

This apparatus thus enables the image of the semi-circular cylindrical surface of the support against which the largest part of the end of a finger may be applied to be obtained on the required scale of reduction.

By way of example an embodiment of the apparatus according to the invention is described below and is illustrated in the accompanying drawings.

In the drawings:

FIG. 1 is a perspective view showing the principle of the apparatus,

FIG. 2 is a partial plan view seen from above,

FIG. 4 is a view in axial sectional elevation.

Figure 3:
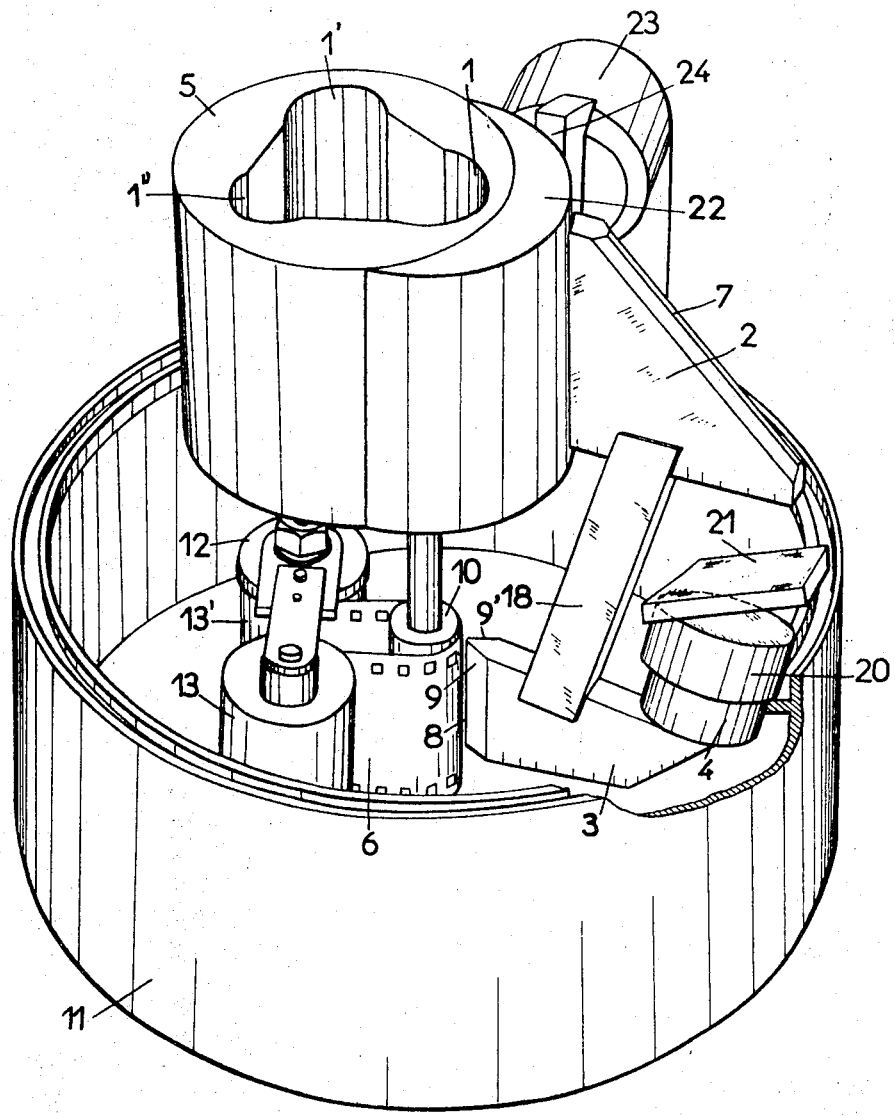
FIG. 3 is a perspective view of the complete apparatus.

At the instant of taking an exposure the finger is applied against the inner face of a glass support 1 which is hollowed out in the form of a half cylinder of circular section. A movable assembly acting as a shutter is provided to explore successively all the generatrices of the transparent support 1 and form images thereof on a photographic film. This movable assembly is composed of two prisms 2 and 3 which twice turn the light through a right angle and between which is disposed, along the path of the light rays, a photographic objective 4; this assembly is constrained to trace out, with regular movement of suitable speed for obtaining a correct exposure of the film 6, all the radial planes of the half cylinder forming the support 1 successively by rotation of the axis X Y of the support 1. It reconstitutes on a sensitive film placed in a light tight box (not shown in FIG. 1) and disposed on a half cylinder on the axis X Y an image which is simply displaced translationally and reduced of the outline of the papillary lines in contact with the glass of the support. FIG. 1 shows the path of the light in the movable assembly which provides an image at A' on the sensitive film of a point A situated on a generatrix of the support surface.

By means of a suitable angular spacing of the plane of transmission of the light in the movable assembly, it is possible to obtain a viewing angle of the generatrices of the support cylinder 1 which is very near the critical angle of reflection of the transparent medium used for the construction of the support.

FIG. 2 represents a section perpendicular to the axis X Y and shows the relative disposition of the planes of the incident light and the reflected light.

The direction of the light in the incident plane is represented by the arrow S A adjoining the light source plane to the generatrix of the support passing through A which is to be photographed. It makes, with the direction OA, an angle $\alpha$ determined by the relation $\sin \alpha = 1/n$, $n$ being the reflective index of the transparent material forming the support and $\alpha$ the corresponding critical angle of refraction. The reflected light travels in the movable optical system M in a plane symmetrical to the first in relation to O A in accordance with the laws of reflection of light.

When the movable assembly M is driven with a rotational movement around the axis X Y, the position of which in the figure is at O, all the successive generatrices of the support are described. If the light source is moved by connecting it to the movable assembly, it will be seen that the direction of exposure remains unchanged throughout the movement of sweeping out the different generatrices of the support, the point A describing the semi-circle $u$ $v$. This particular direction of exposure procures an appreciable advantage; actually along the generatrices A and in the positions in which a papillary ridge is in direct contact with the material of the support and as the result of the natural transpiration of the finger, there will be a destruction of the total internal reflection of the light by the surface of the support as a result of the relative continuity along its path of the indices of refraction. In contrast, in the regions which correspond to the valley lines of the finger, a bed of air remains imprisoned between the skin and the material of the support, which causes the total internal reflection of the light following the plane of the line A T.

There is thus obtained an extremely high contrast between the lines of the ridges and the lines of the valleys on the negative.

FIG. 1 shows the device in a more complete manner.

The transparent support 5 is shaped in the form of a barrel and comprises three semi-cylindrical recesses or grooves 1, 1', 1'' permitting the application of fingers of unequal thicknesses. The groove 1 of suitable diameter is placed, as desired, facing the movable assembly by rotation of the barrel and is then fixed for the exposure. The barrel turns against a transparent cylindrical segment 22 having in section the shape of a crescent.

The first reflecting prism, shown at 2, is formed by a roof shaped prism of which the ridge 7 makes an angle of 45° with the generatrix of the support. The second reflecting prism, shown at 3, is a prism with a plane surface inclined at 45° of the axis of the generatrix, its exit face being very narrow and formed by two convergent facets 9, 9' so as to prevent any parasitic light other than that coming from the objective 4 from reaching the film 6. As the light reflected from the generatrix A which is being explored at any instant is propagated in a vertical plane T making an angle $\alpha$ with the radial plane passing through this generatrix (FIG. 2), the intermediate images of all the generatrices successively explored lie in planes parallel to each other and making $\alpha$ plane T so as to re-assemble these images and project them on to the film 6 along the generatrices of the cylinder on which this film is supported. The objective 4 is inclined in such a manner that its plane may also make an angle $\alpha$ with the said plane T. The sensitive film 6 is disposed along a surface of a cylindrical drum 10 similar to that of the groove 1 and co-axial with it. It is placed in a light tight box 11 of which the movable cover supports the movable assembly (FIG. 4) in such a manner that only the light issuing from the second prism can affect the sensitive surface 6 in the manner of a slit-type shutter. The film is advanced gradually and in step with the exposures by a suitable mechanism 12 driving the take-off and take-up spools 13; 13'.

A correct exposure of the film is obtained by means of a greater or less rapid scanning of the generatrices of the support, in accordance with the sensitivity of the emulsion employed, of the movable light reflecting assembly. As shown in FIG. 4, this scanning is obtained with the aid of a reduction gear motor 14 meshing with gear teeth formed on the edge of the rotating cover 16 of the casing 11. This casing presents an opening 17 forming a light tight passage for the support arm 18 connecting the two prisms 2 and 3 and fixed in any suitable manner to the cover 16. In a second opening 19 is fixed with the inclination α defined above, the mounting 20 for the objective 4. The light source 23 with the slit 24 is also carried by the cover 16. Means are provided for switching on the luminous source at the time the motor is started and for switching off the supply of the motor and the light source at the end of the travel of the movable assembly.

When the groove of the barrel 5 is changed, as a result of the size of the finger to be photographed, and to avoid having to modify the lengths of the optical paths to obtain an image which remains on the surface of the film, there is inserted in the path of the light arrows a parallel-faced sheet represented at 21 of suitable thickness which corrects the lengths of these paths, re-establishes the adjustment and conserves unchanged the reduction ratio between object and image.

The constant length of the optical paths, the focal distance of the photographic objective, the angle and inclination of the object on the plane of reflection of the light, the thickness and attitude of the sheet with parallel faces necessary as a function of the diameter of the support are calculated by the usual optical methods.

By way of example, the photography of the development plan of the relevant surface of a finger which is inscribed in a rectangle of 40 x 36 mm at the maximum, may be effected by using an objective of 28 mm focal length, of angle of view of the order of 75°, with a reduction ratio equal to 0.6 using, in order to constitute the light reflecting device, a glass of refractive index near 1.5, the negative having the standard form 24 x 24 mm.

In order to prevent the external surface of the transparent block 22 on which the entry face of the reflecting prism 2 is to slide as well as the inner surface of this block against which turns the barrel 5 from totally reflecting the incident light, these surfaces are coated with a transparent liquid of any refractive index, which eliminates any internal reflection on traversing the various surfaces.

I claim:

1. Apparatus for photographing papillary lines in place of taking fingerprints with an ink pad, the said apparatus comprising a cylindrical hollow support against the internal face of which the surface of the finger to be photographed is adapted to be applied and a movable assembly movable about the axis of said support and including a light source formed by a slit parallel to the axis of the cylindrical support, an optical member for successively exploring all the generatrices of the said transparent support, said slit being arranged to emit a flat narrow light beam which intersects the plane of symmetry of the exploring member along a generatrix of the inner face of the transparent finger support, a photographic objective for receiving the light rays from the said optical exploring member, and a second optical member receiving the image provided by the objective, a cylindrical photographic film support surface coaxial with the inner face of the cylindrical finger support and onto which the image provided by the objective is reprojected by the second optical member, said film and support surface being stationary during said projection.

2. Apparatus according to claim 1, in which the radial plane containing the light slit is displaced from the plane of symmetry of the optical exploring member by an angle twice the critical angle of refraction of the material forming the transparent finger support.

3. Apparatus according to claim 1, in which the exploring optical member is a prism of flat form presenting a plane entry face adapted to move along the outer surface of said finger support, a rear, roof-shaped face of which the ridge is at 45° relative to the entry face and a plane exit face, while the receiving optical member is a second prism comprising a rear face at 45° to the axis of the apparatus and a narrow exit face adapted to move along the photographic film support surface, the said narrow face being formed between two convergent lateral facets.

4. Apparatus according to claim 3, in which the principle plane of the objective is inclined at an angle equal to the corresponding critical angle of the material of the transparent support relative to the principal plane of the apparatus, that is to say to the vertical plane in which the light rays are propagated from the entry face of the first prism to the exit face of the second prism.

5. Apparatus according to claim 1, in which the transparent support is formed by a transparent hollow barrel having cylindrical recesses formed in its inner surface, the said recesses being of different diameters to accommodate fingers of different sizes, the said barrel being angularly adjustable about its axis.

6. Apparatus according to claim 5, in which a fixed transparent cylindrical segment of crescent section is interposed between the barrel and the entry face of the exploring optical member, the inner face of the said segment is co-axial with the barrel and the external face of the said segment is co-axial with the axis of rotation of the movable assembly, a transparent liquid being preferably interposed in use between this segment and the barrel and between the segment and the exploring optical member.

7. Apparatus according to claim 5, and including a sheet having parallel faces and an appropriate thickness whereby to be interposed between the exit of the first prism and the objective to compensate for differences in optical path lengths for different recesses of the barrel.

8. Apparatus according to claim 1, in which the photographic film support surface is formed by a drum co-axial with the movable assembly and mounted within a casing and the movable assembly is mounted on a rotatable cover for the said casing.